April 21, 1964

E. KRAMAR 3,130,407

TWIN BEACON SYSTEM

Filed Sept. 11, 1961

INVENTOR
ERNST KRAMAR

BY *Percy P. Lantzy*

ATTORNEY

April 21, 1964

E. KRAMAR 3,130,407

TWIN BEACON SYSTEM

Filed Sept. 11, 1961

INVENTOR
ERNST KRAMAR

BY

ATTORNEY

April 21, 1964 E. KRAMAR 3,130,407
TWIN BEACON SYSTEM

Filed Sept. 11, 1961 9 Sheets-Sheet 3

INVENTOR.
ERNST KRAMAR
BY
ATTORNEY

April 21, 1964   E. KRAMAR   3,130,407
TWIN BEACON SYSTEM
Filed Sept. 11, 1961   9 Sheets-Sheet 5

INVENTOR.
ERNST KRAMAR
BY
ATTORNEY

April 21, 1964 E. KRAMAR 3,130,407
TWIN BEACON SYSTEM
Filed Sept. 11, 1961 9 Sheets-Sheet 9

IF $\varphi$ = const: $\dfrac{b}{a}$ = const. = $\dfrac{1 + \tan \varphi}{1 - \tan \varphi}$ Distance of the center of the circle from line of symetry $\quad x_M = -\dfrac{e}{\sin 2\varphi} \quad$ Radius $r = e \,|\cot 2\varphi|$

INVENTOR
ERNST KRAMAR
BY
ATTORNEY

United States Patent Office 3,130,407
Patented Apr. 21, 1964

3,130,407
TWIN BEACON SYSTEM
Ernst Kramar, Pforzheim, Germany, assignor to International Standard Electric Corporation, New York, N.Y., a corporation of Delaware
Filed Sept. 11, 1961, Ser. No. 137,411
Claims priority, application Germany Sept. 24, 1960
7 Claims. (Cl. 343—107)

This invention relates to a radio navigation system which may be used for enroute aircraft guidance as well as for guiding a craft to a landing. More particularly this invention relates to a radio course beacon system of the kind described in which two antenna systems are used installed mirror-image like on both sides of a line of symmetry which may be used as a runway in the terminal area.

It has been recognized that two radiation patterns versus direction created by two antenna systems separated by several wavelengths are composed in space to form a composite pattern from which positional information can be obtained. The composition of the two patterns can also be effected in the airborne receiver as will be pointed out hereinafter more specifically. It has been recognized furthermore that positional information due to two separately radiated patterns versus direction combined in space or in the receiver can be obtained by using all kinds of patterns versus direction known per se, irrespectively of the manner in which they have been generated. The method to generate the various types of patterns versus direction is well-known and will be described in the proper embodiments of this invention.

Various types of localizer and glide slope beacons utilizing radiant energy transmission from two antenna systems spaced from one another on opposite sides of a runway are well-known. (ASV 23-system originating in France; U.S. Pat. No. 2,543,081 to Watts; U.S. Pat. No. 2,593,485 to Pickles; U.S. Pat. No. 2,429,630 to Kandoian.) In these systems directional information is obtained by comparing signal amplitudes of different modulation frequencies derived from separate radiations of each antenna system, especially as the difference of the modulation degrees of the modulated radio frequency radiated. However, none of the systems mentioned utilizes signal phases of only one modulation frequency of the combined pattern created in space or set up in the receiver, as the system according to the invention does.

As mentioned above all kinds of patterns versus direction may be used to obtain positional information. Appropriate patterns can be generated:

(1) Pure carrier-type patterns versus direction obtained by unmodulated or modulated carrier waves;
(2) Modulation-degree patterns versus direction by suitably radiating carrier- and sideband energy of a prescribed modulation frequency;
(3) Doppler-type frequency-deviation patterns versus direction provided by the simulated motion of a single antenna on a linear antenna system, the velocity of the simulated motion being according to a sine law, thus setting a figure-of-eight frequency deviation pattern versus direction.

To provide positional information in the system according to the invention, two modes of operation are available when modulation-degree patterns versus direction and Doppler-type frequency deviation patterns versus direction, respectively, are utilized. The evaluation is accomplished with respect to the relative phases of the modulation frequencies or, in the Doppler system, respectively, with respect to the relative phase relationship of the simulated movements of the single antennas on their appropriate linear antenna systems. By setting a 180 degree phase relationship of the simulated movements in the Doppler system, signal amplitudes derived from Doppler frequency modulation of the beat frequency are evaluated in the receiver; by setting a phase relationship other than 180 degrees, e.g. 90 degrees relative phase, positional information is obtained by comparison of the signal phase taken from the composite pattern in space, the signal being the vector sum of the signals separately radiated. For practical use the most interesting radiation patterns versus direction used in the system of this invention are those where the information remains undisturbed by multipath propagational effects, which fact is especially valid for the Doppler-type system.

It is therefore an object of the present invention to provide an improved navigation system for enroute and terminal area aircraft guidance. It is another object of this invention to provide such a navigation system compatible with current airborne VOR-airborne equipment.

It is a feature of this invention to provide a radio navigation system to derive positional information on board a vehicle comprising at the ground installation first and second antenna systems positioned on both sides of a line of symmetry and spaced therefrom by several wavelengths of the operating radio frequency, two sources of radio frequency signals, said antenna systems being energized by said sources of radio frequency signals respectively, consecutively or simultaneously, according to the mode of operation, each of the antenna systems thus radiating a modulation pattern versus direction, said patterns being identical and located mirror-image like with respect to said line of symmetry, said patterns being composed in space or in the receiver respectively so that a composite pattern is created in space or set up in an equivalent manner in the receiver, said composite pattern representing loci of equal phase, or of equal frequency deviation respectively, providing positional information by phase comparison, or by determination of frequency deviation with respect to said line of symmetry; airborne receiving means adapted to derive from said composite pattern said positional information representative of the value of said loci indicative of the spatial deviation of said vehicle from said line of symmetry.

The above mentioned and other objects and features of this invention will become apparent, and the invention itself will be clearly understood by reference to the following description of several embodiments of the invention taken in conjunction with the accompanying drawings, wherein:

FIG. 1 shows a set of curves characterised by constant phase relationship (isophase diagram). This diagram is obtained when carrier-type or modulation-type patterns are radiated as figure-of-eight patterns by means of two spatially separated antenna systems A and B, assuming that the carrier or modulation frequencies are in phase quadrature; in the auxiliary drawing of FIG. 1 a vector diagram is shown by which the composition of the proper vectors (1) and (2) taken from the appropriate radiation patterns with respect to a predetermined point P will be understood. A mathematical treatment of the problem, not further explained herein, shows that the ratio of the sine functions of any angles $\alpha$ and $\beta$ related to any point P, referred to in the drawing of FIG. 1, is a constant value which is $tg\,(45°-\varphi)$, wherein $\varphi$ means the proper phase angle.

$$\frac{\sin \beta}{\sin \alpha} = \text{const} = tg(45° - \varphi)$$

Figure 4A:
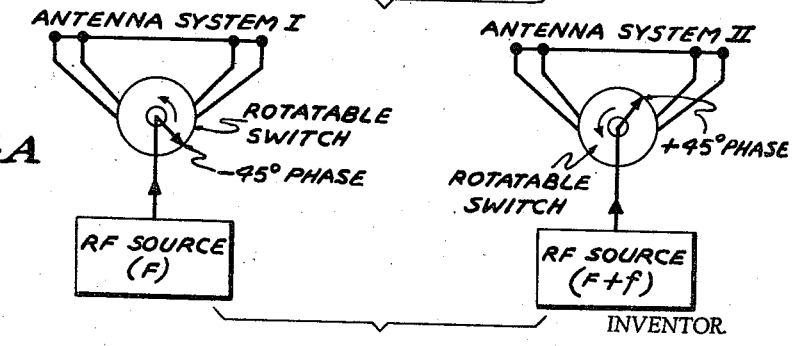
Figure 4:
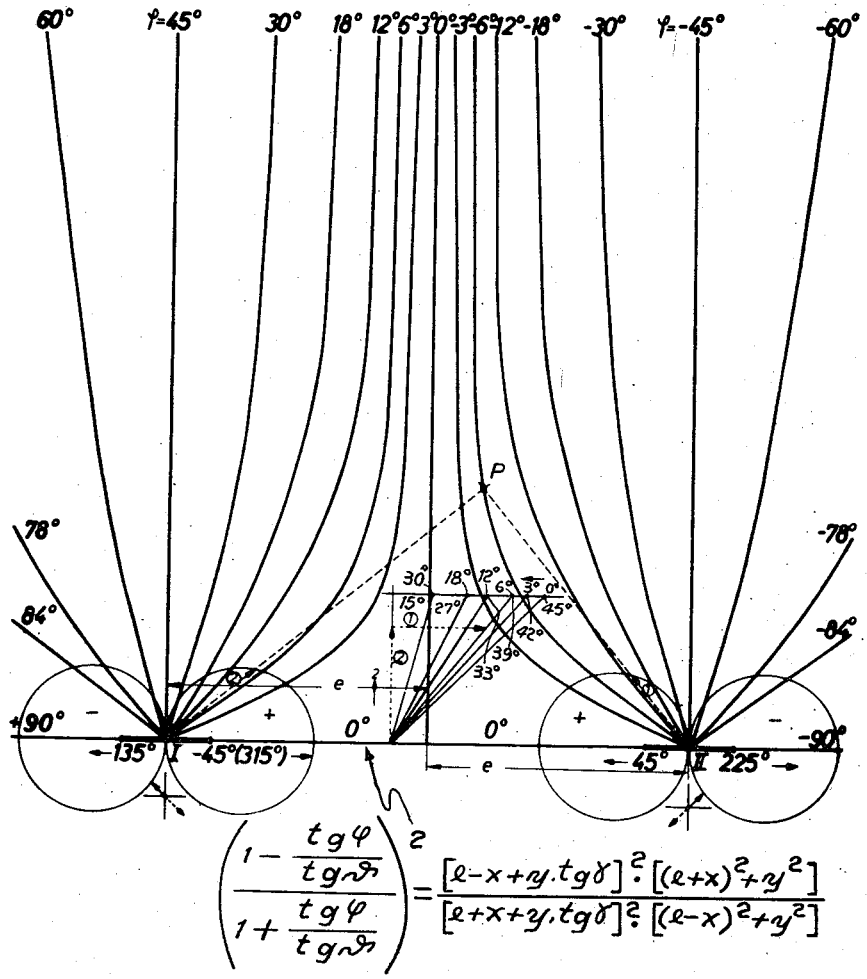
Figure 5:
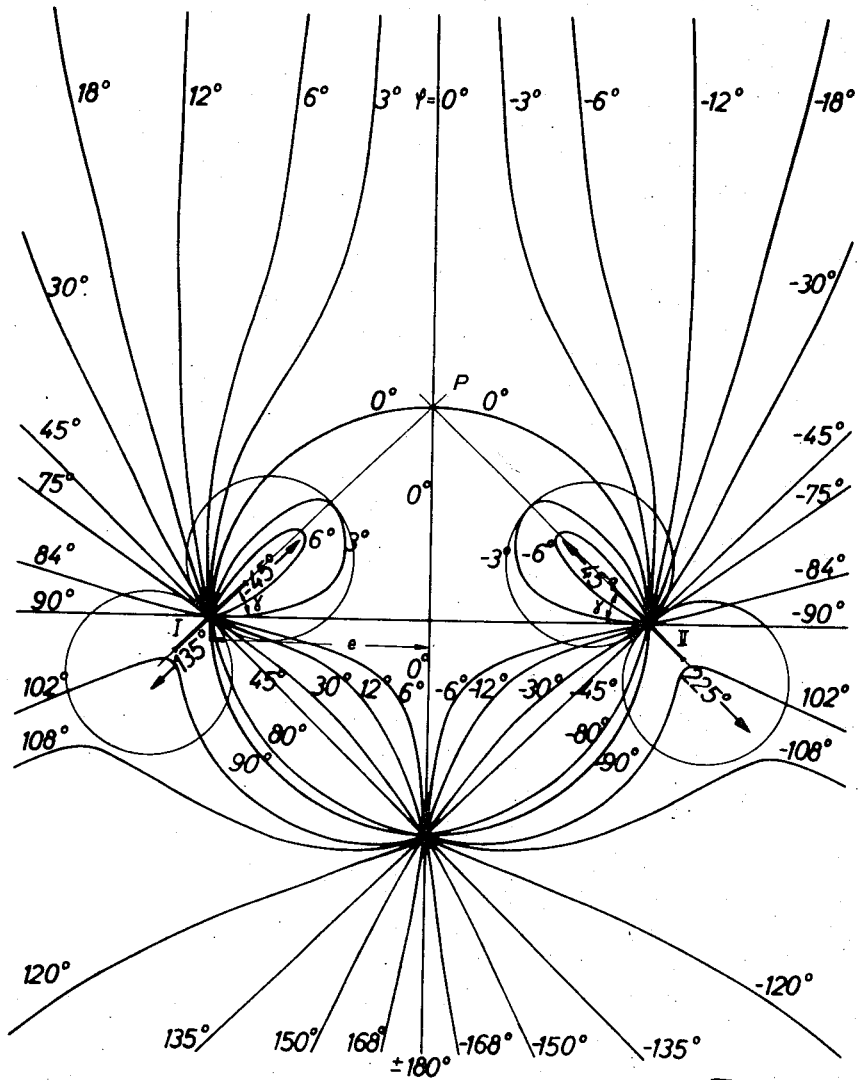
Figure 6:
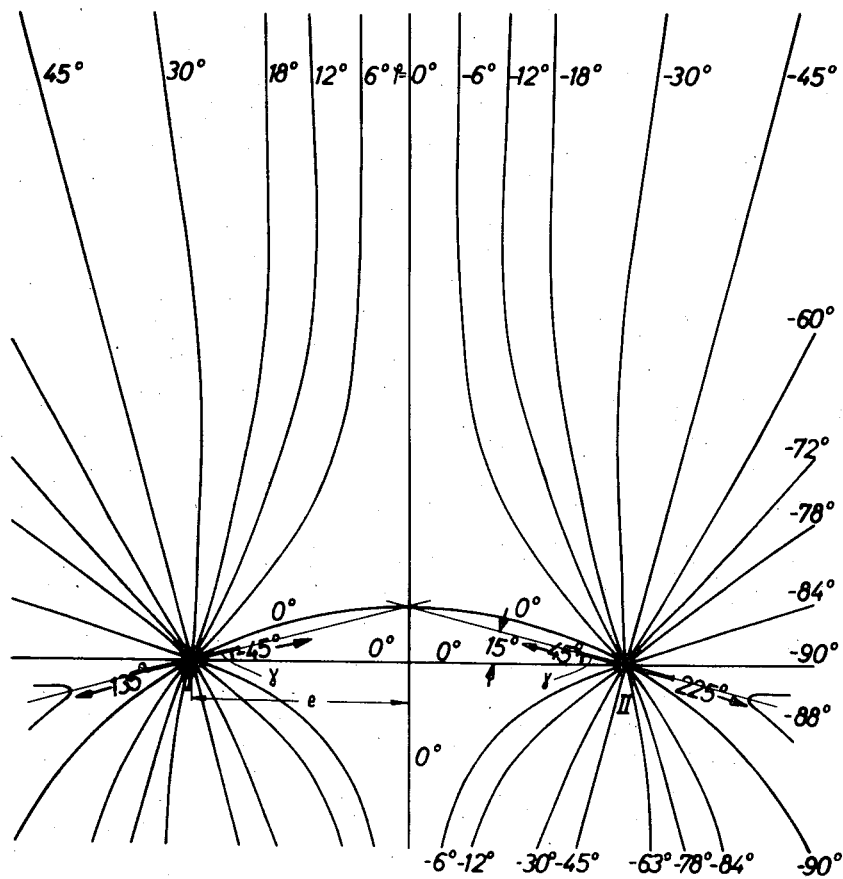
Figure 7:
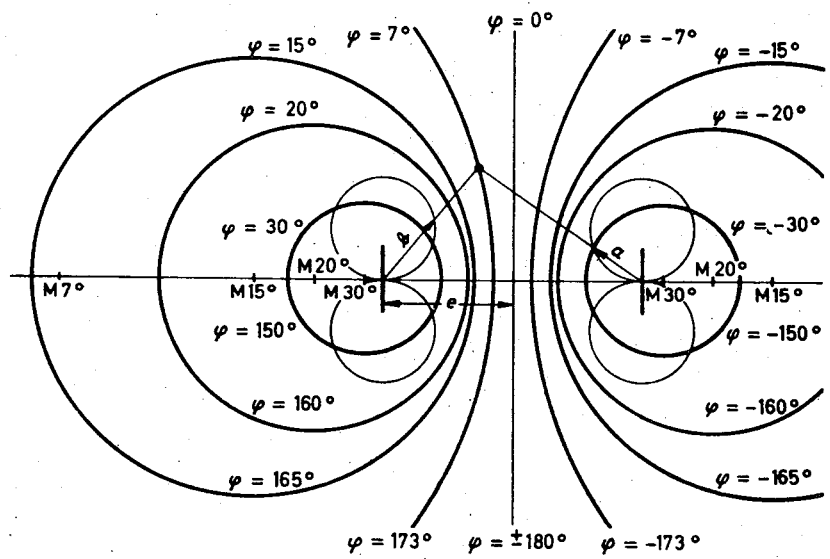

FIG. 4 is also referred to a Doppler-system like FIGS. 5, 6 and 7, and shows a set of lines of constant phase relation (isophases) with respect to a reference phase signal. This diagram represents the composite pattern in space; it is originated when two linear antenna systems consisting of a plurality of single radiators, mounted on a common straight line are fed with RF-energy so that the movement of a single radiator on each antenna system is simulated, the relative movements of the two single radiators having a relative phase of 90 degrees, e.g. −45 or +45 degrees relative phase respectively with respect to a reference phase signal.

FIG. 4 shows diagrams of the antenna systems of different phase.

FIG. 5 shows the field of isophases when each of the two linear antenna systems form an inclination angle of 45 degrees with respect to the line connecting their centers, assuming that the movement of a single radiator on each antenna system is simulated with a relative phase of 90 degrees.

FIG. 6 shows another example of the field of isophases generated when the linear antenna systems form an inclination angle of 15 degrees and when the simulated movement of the two single radiators on their appropriate linear antenna systems is carried out with a relative phase shift of 90 degrees, that is −45 or +45 degrees respectively, with respect to the reference phase signal.

FIG. 7 shows the field of isophases when the two linear antenna systems are in parallel spaced from the line of symmetry, the simulated movements of the two single radiators being phase shifted by 90 degrees.

Figure 1:
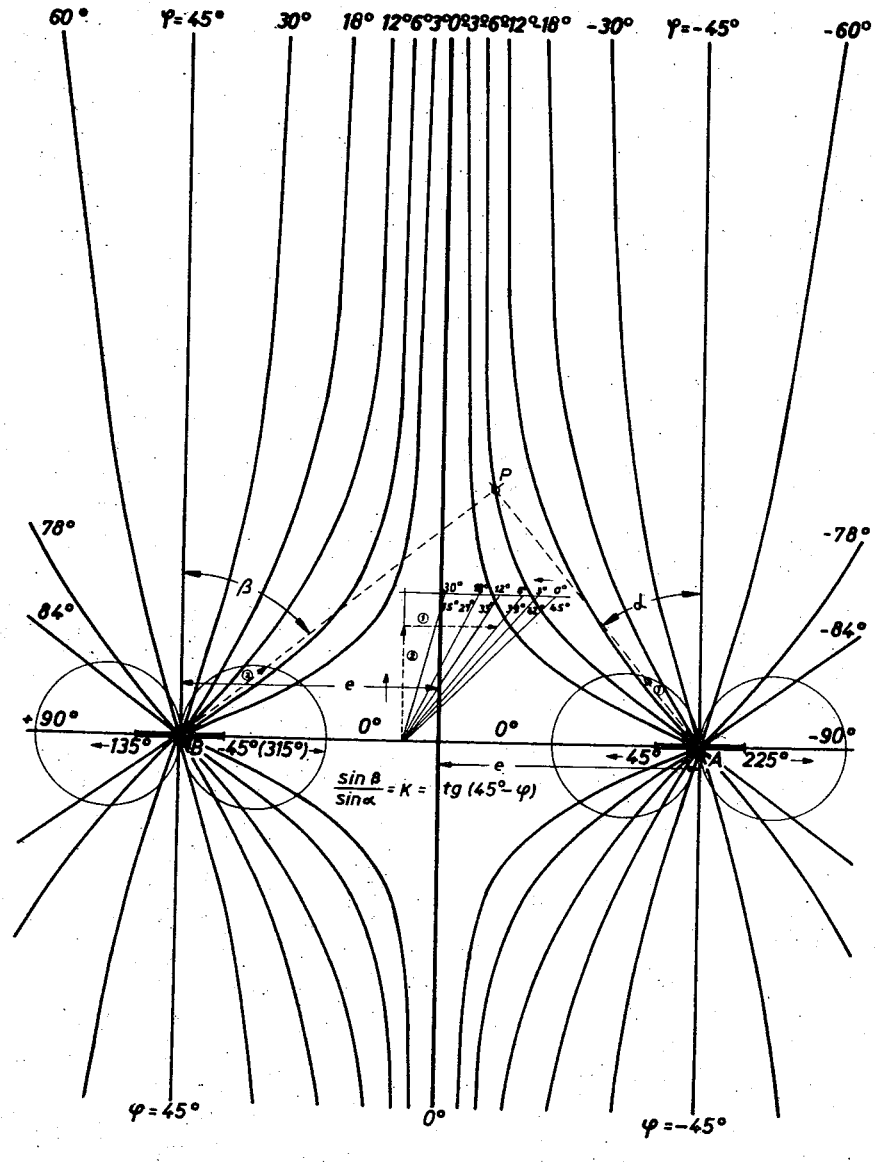
Figure 2:
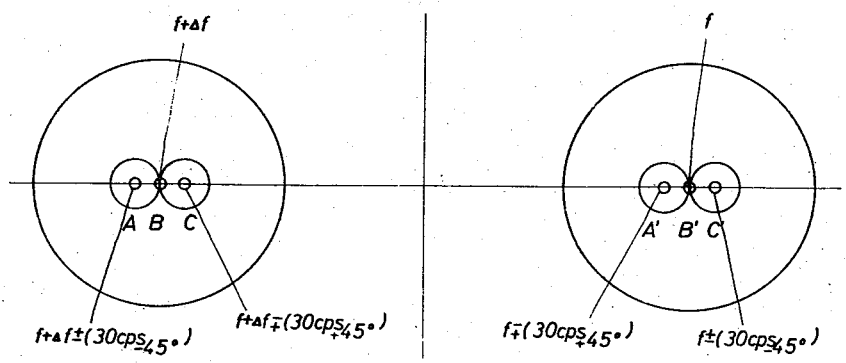
FIG. 2 shows in schematic form, by way of example, an antenna system consisting of three single radiators, suitably spaced and energized, by means of which a modulation pattern versus direction can be obtained.

In an embodiment of the system to be described in conjunction with FIG. 1 and FIG. 2 there are provided two radiation patterns versus direction of the same kind on either side of a line of symmetry, the origin of the patterns being spaced from said line of symmetry by a predetermined amount e. These patterns are produced by two spatially separated antenna arrays whose radiations versus direction constitute a field of loci of constant relative phase with respect to a reference phase signal radiated omnidirectionally by the beacon, whereby proper directional information is derived from modulation amplitudes in a cooperating receiver. The method how to produce modulation-type patterns versus direction is well-known to those skilled in the art.

Radiation patterns versus direction can be produced either by alternately radiated carrier waves of the same frequency or by simultaneously radiated carrier waves of different frequencies, the alternately radiated carrier waves of the same frequency or the simultaneously radiated carrier waves of different frequencies being modulated with modulation signals of the same frequency. Such embodiments, however, are not shown in the drawings. The modulation frequency of the carrier waves feeding each of the antenna systems A and B of FIG. 1 respectively are subjected to a phase difference other than 180 degrees, especially 90 degrees. Thus the modulation frequency amplitudes are vectorially composed in the radiation field according to their own phase relationship, to form a resultant line of the vector sum. Positional information is obtained according to the invention by comparing the phase of the vector sum with the phase of a reference signal, separately generated and radiated omnidirectionally from the ground station in a conventional manner.

As indicated above with respect to FIGS. 1 and 2 of the drawings a figure-of-eight modulation degree pattern versus direction can be produced in radiating carrier and sideband energy by a suitable antenna system.

Figure 2A:
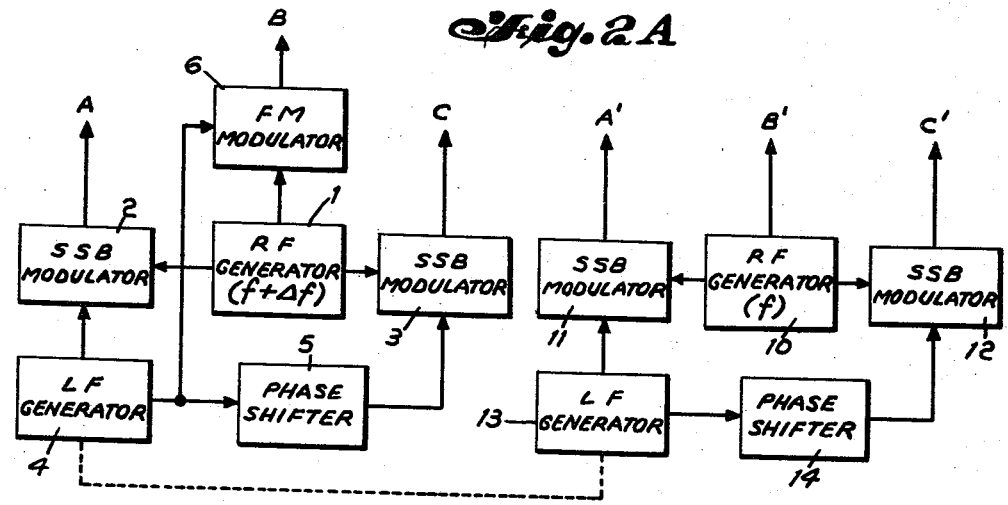
FIGS. 2A and 2B are block diagrams of the transmitting and receiving systems of this invention.
Figure 2B:
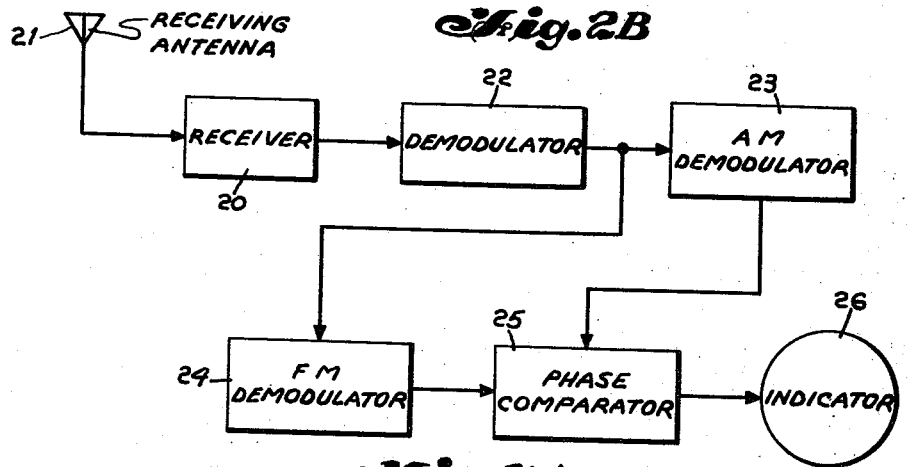

Referring now to FIGS. 2 and 2A a modulation-degree pattern versus direction can be established by providing two antenna systems each consisting of three radiators (A, B, C—A', B', C') arranged on a straight line. Their center antennas (B, B') simultaneously radiate carrier waves of different frequencies ($f$ and $f+\Delta f$) respectively in an omnidirectional radiation pattern, as indicated by large circles in FIG. 2. Both of the outer antennas (A, C—A', C') radiate lower and upper sideband energy of the modulation frequency, e.g. 30 c.p.s., in phase opposition, as indicated by references in FIG. 2. The phase of the modulation frequency of the sideband-energies fed to the outer antennas A—C and A'—C' respectively are in phase quadrature at any instant, e.g. lacking or leading in phase by 45 degrees with respect to a reference phase signal. The inner antennas C and A' and the outer antennas A and C' always have the same relative modulation phase, e.g. +45 or −45 degrees respectively in order to establish mirror-image like modulation-degree patterns versus direction. Referring now to FIG. 2A, there is shown an embodiment of the transmitter of this invention. A first radio frequency generator 1 generates a signal $f+\Delta f$. This signal output is fed to single sideband modulators 2 and 3. Also fed to single sideband modulator 2 is the output of a low freqency generator 4. The output of low frequency generator 4 phase shifted in phase shifter 5 is coupled to single sideband modulator 3. The low frequency signal and the radio frequency signal are also coupled to frequency modulator 6. The respective signal outputs of sideband modulators 2 and 3 and frequency modulator 6 are coupled to antennas A, B and C, respectively. The right-hand side of FIG. 2A discloses a radio frequency generator 10 having an output signal $f$ which is fed to single sideband modulators 11 and 12. The output of a low frequency generator 13 is coupled to single sideband modulator 11 and after being phase shifted in phase shifter 14, is fed to single sideband modulator 12. The respective signal outputs of single sideband modulators 11 and 12 and radio frequency generator 10 are fed to antennas A', B' and C'. Referring to FIG. 2B, the carrier waves are received in the radiation field by receiver 20 via antenna 21 with almost constant field strength but modulated at each point of the radiation field with a variable modulation degree according to the modulation-degree pattern versus direction. The output of receiver 20 is first demodulated in demodulator 22 from which the signal is fed to AM demodulator 23 and FM demodulator 24. The outputs of demodulators 23 and 24 are coupled to phase comparator 25 and the output of phase comparator 25 is fed to indicator 26. The low frequency voltage of the beat frequency $\Delta f$ provided in the receiver output is modulated with the vector sum of the 30 c.p.s. modulation of the appropriate carrier frequencies radiated. The phase angle $\varphi$ of the 30 c.p.s. modulation which can be determined with respect to a fixed phase reference signal of 30 c.p.s., transmitted in a conventional manner by one of the carrier waves, identifies, in a likewise conventional manner, a certain line within the isophase field of FIG. 1. It will be seen that the lines of constant relative phase run almost in parallel in the remote radiation field, which fact may be of particular importance for enroute guidance of several aircrafts to a destination.

The signals from such radio beacons described can be detected by means of airborne receivers suitable to perform a phase comparison between two low frequency signals derived from received radio waves, e.g. the well-known VOR receivers.

As mentioned above FIG. 3 through FIG. 7 refer to

Doppler-type beacon systems using two separated linear antenna systems, called Doppler-twin beacon system.

Though various types of Doppler beacon systems using a single linear antenna system, are known, e.g. by U.S. Pat. No. 2,411,518 none of them is equipped as a twin beacon using two spaced linear antenna systems. Moreover, the evaluation of the Doppler frequency of prior art systems is quite different from that according to the invention, where a composite pattern in space is created from which positional information can be obtained.

It is known to those skilled in the art that the principles of Doppler systems can be transferred from beacon systems to direction finding systems and vice versa by providing corresponding modifications in the equipment. It is also known that a freqency deviation figure-of-eight pattern versus direction can be assigned to a linear antenna system consisting of a plurality of single antennas at a predetermined spacing, the single antennas being fed with RF-energy successively so that a periodic motion of a single antenna at about sinusoidal velocity is simulated along the antenna system. The frequency deviation amount is varying with the direction in which the radiated waves are being received, so that the signal amplitude derived from frequency deviation is responsive to the direction from which the waves have been received.

A Doppler-type localizer beacon using a linear antenna system has been proposed too in U.S. Patent No. 3,094,697 in which two single antennas are successively coupled each to a transmitter at a sinusoidal coupling speed corresponding to a predetermined coupling frequency, so that a reciprocative movement of two single antennas is simulated. The two antennas are fed with different carrier frequencies of such amounts of energy so that a sinusoidal frequency modulated beat frequency is originated in a remote receiver. An antenna system fed in this manner is originating, as mentioned before, a beat frequency deviation pattern versus direction which has a figure-of-eight form in polar-coordinates when the mutual spacing of the single antennas is less than a quarter wavelength. In this system the magnitude of the signal derived from said frequency modulated beat frequency indicates the direction whereas the phase of the signal (+) or (−) is responsive to the left or right off-course position of the receiver with respect to the prescribed course. In such localizer beacons the antenna array is located in line with the runway which fact may be an obstruction for landing aircraft.

The invention is making use of such known principles to be utilized in twin beacons, especially as to the method how to generate frequency deviation patterns versus direction and how to provide a frequency modulated beat frequency by simulated antenna movements.

According to the invention two linear antenna systems consisting of a plurality of single antennas of preferably equal length are provided, spaced by several wavelengths, located equi-distant on opposite sides of a line of symmetry, which may be the runway. According to the invention on each antenna system the movement of a single antenna is realized or simulated, the single antennas being energized with different carrier frequencies and with different power ratings so that a frequency modulated sinusoidal beat frequency can be detected in a remote receiver. If the movement of the two antennas on their appropriate antenna systems is reciprocating, that is with a phase displacement of 180 degrees, a composite pattern in space is created consisting of lines of constant frequency deviation of the beat frequency. This composite pattern (FIG. 3) is utilized for positional information.

If, however, the simulated motion of the antennas is shifted by any other angle rather than 180°, particularly 90°, a composite field of loci of constant relative phase (isophases) with respect to a reference phase signal is established. The reference signal, as well-known, must be of the same frequency as the low frequency signal obtained from the frequency modulation of the beat frequency. From this composite pattern in space (FIG. 4) positional information can be extracted by phase comparison.

It is seen that by dividing the antenna system into two units and by utilizing two frequency deviation figure-of-eight patterns versus direction various combination possibilities are existing as to the angular orientation of the linear antenna systems as well as to the time relation, i.e. phase relation of the simulated movements of the single antennas on their linear antenna systems. The antenna systems can be mounted on a common straight line, or at a suitable angle with respect thereto or in parallel to one another. The simulated motion can be reciprocative, that is with a phase shift of 180 degrees, or in any other suitable relative phase number; some embodiments thereof will be described hereinafter. Thus in the remote radiation field as well as at short ranges various fields of lines or surfaces in space will be created which can be evaluated for positional information as loci of either constant amount of frequency deviation or of constant relative phase with respect to a fixed phase reference signal, this signal corresponding to the commutation frequency of the antenna systems, which is transmitted by the beacon and received by airborne equipment in a conventional manner.

Figure 3A:
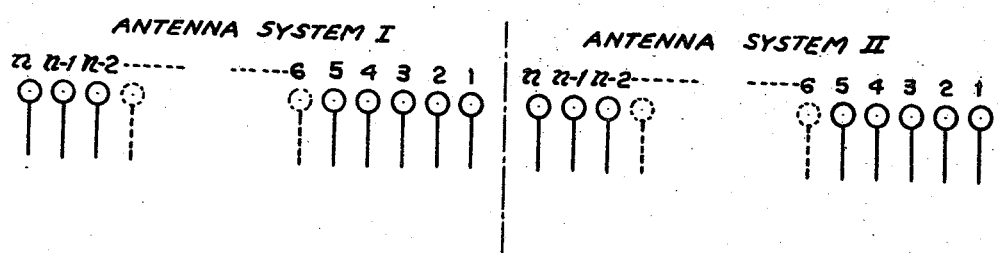
FIGS. 3A, 3B and 3C are diagrams of the antenna system and switching means for the antenna system.
Figure 3:
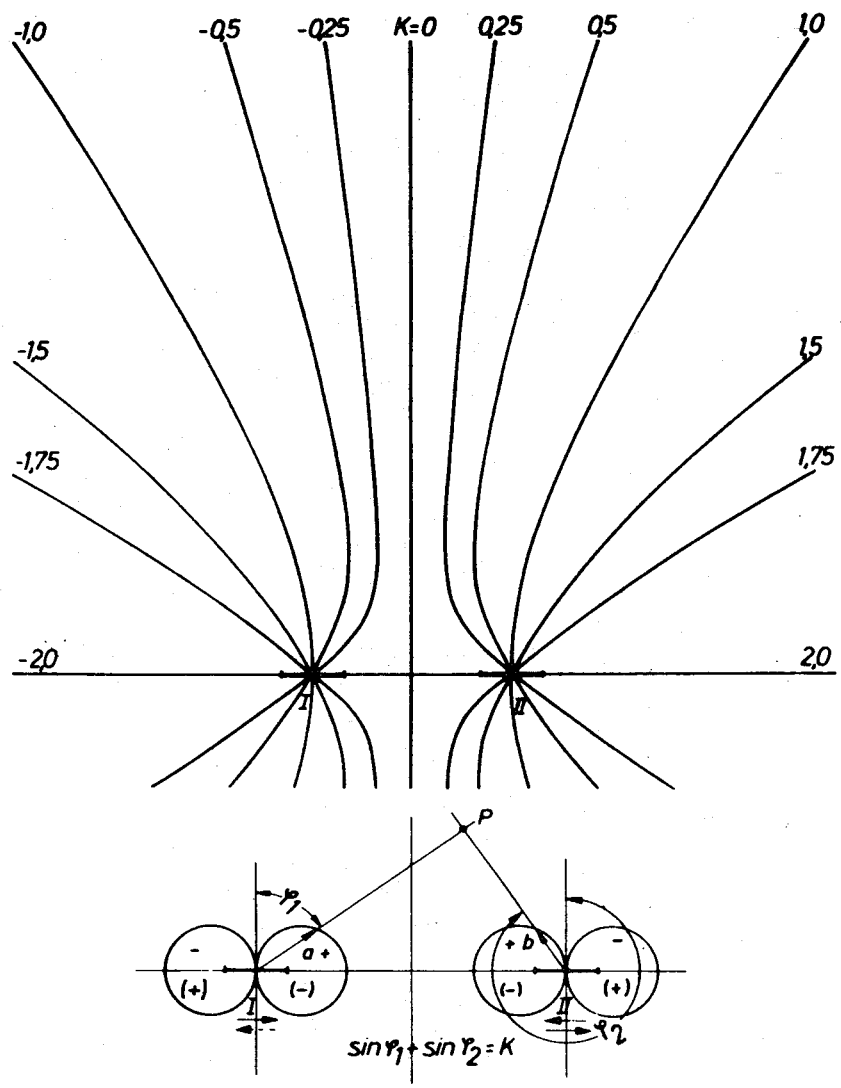
FIG. 3 is referred to a Doppler-system and shows a set of lines of constant frequency deviation representing the composite pattern in space which is established when two linear antenna systems consisting of a plurality of single radiators, mounted on a common straight line are fed with RF-energy so that a reciprocating movement (180° phase) of a single radiator on each antenna system is simulated.
Figure 3B:
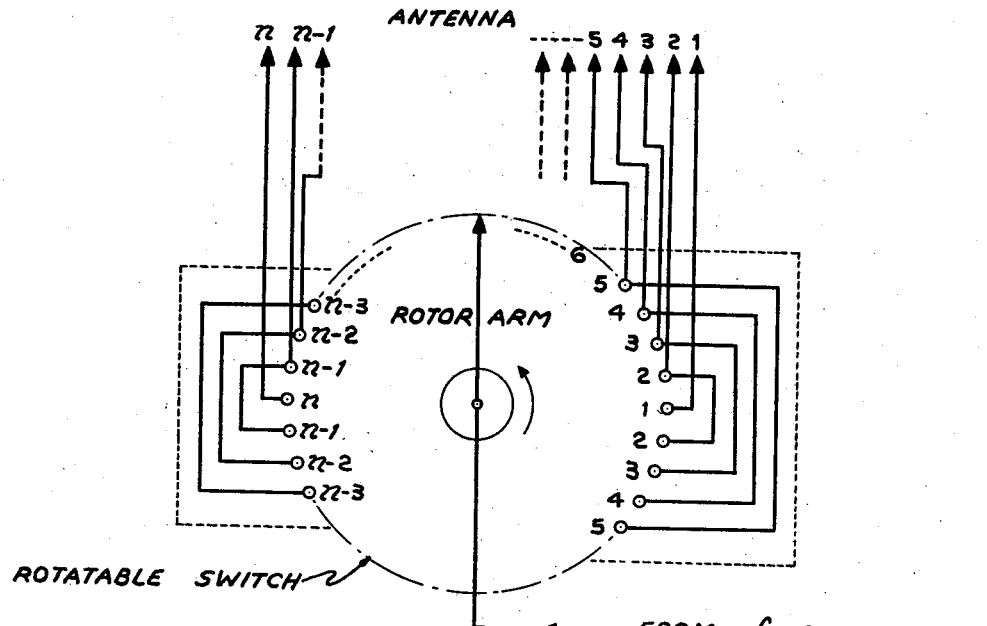
Figure 3C:
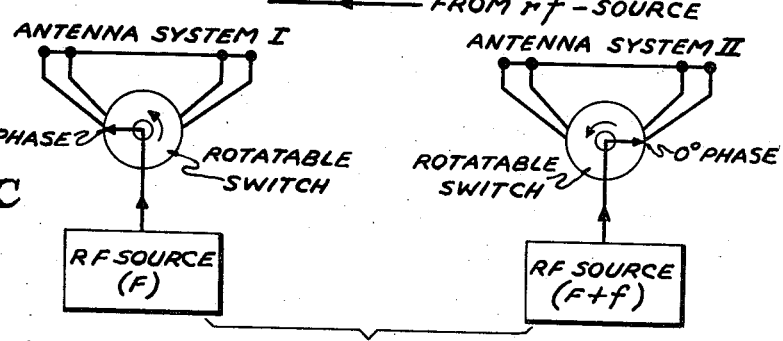

Referring now to FIGS. 3 and 3A references I and II indicate each a linear antenna system consisting of a plurality of single antennas at predetermined mutual spacing, e.g. a quarter wavelength. The antenna systems are several wavelengths long, in order to utilize the well-known advantages of wide-aperture antenna systems. The length of antenna system I may differ from that of the antenna system II, but they are preferably of equal length for simplicity of explanation, so that the amounts of frequency deviation of both antenna systems are equal, assuming equal operating conditions for both antenna systems I and II. On each antenna system the sinusoidal motion of a single antenna is simulated by means of a well-known switching device, e.g. according to FIG. 3B, operating at a frequency $f_n$. In this embodiment the movements of the two antennas are reciprocative, that is displaced in phase by 180 degrees, as indicated in FIG. 3C by the positions of the rotor arms of the switches, the two RF-carriers fed to the antennas differ by a frequency amount $f$, e.g. 10,000 c.p.s., but are within the bandwidth of the cooperating receiver, and the amplitudes of the two RF-carrier energies are such as to provide at the receiver output an almost sinusoidal beat frequency which is the difference of the two RF-carriers. A mathematical treatment of the problem not further explained herein shows that, assuming the above operating conditions, the sum of the sine functions of the angles $\varphi_1$ and $\varphi_2$ extending from a receiving point P to the center points of the two antenna systems I and II and to a prescribed reference direction, i.e. the direction of the line of symmetry, is a constant value K which is indicative of the resulting frequency deviation with respect to point P. The deviation amounts $a$ or $b$ in the frequency deviation figure-of-eight patterns versus direction provided by each antenna system, as well as the associated angles $\varphi_1$ and $\varphi_2$ are shown separately for the sake of clarity in an extra drawing of FIG. 3. The periodic, reciprocative simulated movements of the two single antennas are indicated by solid- or dash-line arrows, and the phase of the frequency deviation produced by antenna motion is illustrated in the drawing by the signs − and + or (−) and (+) respectively.

In a Doppler-twin beacon system operated in the aforesaid manner fields of constant frequency deviation lines will be provided on the left and the right side of a line of symmetry ($K=0$) on which resulting frequency deviation is zero in any case.

By receiving the radiations of a Doppler-type twin beacon operating in the manner described an aircraft can be navigated by detecting the frequency deviation as to amount and sign in a conventional manner and the course is set by means of a constant meter reading.

Referring now to FIGS. 4 and 4A a further embodiment of the invention relating to a special Doppler-type beacon is described, based on the same principles of simulated antenna movements and of the generation of frequency deviation patterns versus direction, but is differing from the embodiment of FIG. 3 not only with respect to the feeding principle of the single antennas simulated to move, but also with respect to the evalution of positional information. In FIG. 4 two linear antenna systems I and II are shown consisting of a plurality of single radiators, as well as their frequency deviation figure-of-eight patterns versus direction produced by simulated motion of a single antenna on each of the antenna systems. If the simulated motion mentioned above is carried out with a predetermined time displacement, i.e. phase displacement, by way of example with a phase shift of 90 degrees, a composite radiation pattern in space is created characterized by lines of constant relative phase. In order to provide a reference phase signal for the evaluation of such isophase fields a phase-locked reference signal of the same frequency as the coupling frequency has to be transmitted by the beacon, as is well-known to those skilled in the art. The operational conditions are not altered if it is assumed that the simulated antenna motion on the antenna system I is performed at a phase angle of −45 degrees with respect to the fixed phase reference signal, and the motion on antenna system II at a phase angle of +45 degrees with respect to said reference phase signal, as indicated in FIG. 4A by the position of the rotor arms of the switches. As well-known from other Doppler type beacon systems the reference phase signal can be transmitted by the beacon as amplitude modulation of one of the carrier waves. The two RF-carrier waves fed to the antennas differ by a predetermined frequency amount $f$, e.g. 10,000 c.p.s. The amplitude ratio of the carrier waves is such, so as to constitute an almost sinusoidal beat frequency $f$ at the receiver output cooperating with the beacon. The phase-displaced feeding of the antennas is indicated in FIG. 4 below the antenna systems I and II by rectangular coordinate systems and solid- or dash-line arrows. By feeding the appropriate antennas phase-displaced by 90 degrees (time displaced by a quarter period), the corresponding frequency deviation figure-of-eight patterns are likewise generated with a time displacement of a quarter period. Consequently the resulting frequency deviation with respect to any point P in the radiation field is composed of two components (1) and (2) phase-displaced by 90 degrees. The resulting frequency deviation, or the signal frequency derived therefrom, is of the same frequency as the coupling frequency $f_n$. This composite signal which is the vector sum of the components (1) and (2) added by observing the proper phase angle of 90 degrees has a proper phase with respect to said reference phase signal, so that a proper line in the isophase field can be determined. The discussion of the quantity of the resulting frequency deviation is of poor significance in conjunction with the field of isophases. The lines of constant relative phase according to FIG. 4, as will be clearly understood from the auxiliary drawing of FIG. 4, can thus be constructed in that the phase angle of the resulting frequency deviation is set as being constant and the proper values of the deviations (1) and (2) are taken from the two frequency deviation patterns versus direction. The lines of constant relative phase may also be calculated with the aid of the following formula:

$$\frac{1-\frac{tg\varphi}{tg\vartheta}}{1+\frac{tg\varphi}{tg\vartheta}}=\frac{[e-x+y\cdot tg\gamma]^2\cdot[(e+x)^2+y^2]}{[e+x+y\cdot tg\gamma]^2\cdot[(e-x)^2+y^2]}$$

$$=\text{const}_1 \text{ for } \varphi=\text{const and } \vartheta=\text{const}$$

This formula is the result of a somewhat complicated calculation not particularly described herein. In this formula $e$ means the distance of the center of the linear antenna systems from the line of symmetry ($\varphi=0$);

$\varphi$ being the phase angle of the isophase lines,
$\vartheta$ being a half of the angle, denoting the phase shift of the simulated movement of the single antennas on their appropriate antenna systems,
$\gamma$ being the inclination angle of a linear antenna system with respect to the line interconnecting the centers of the linear antenna systems.

If thus $\gamma=0°$ it is indicated that the antenna systems I and II are mounted on a common straight line. By $\gamma=90°$ it is indicated that the antenna systems I and II are in parallel and perpendicular to the line interconnecting their centers. The references $x$ and $y$ are the Cartesian coordinates of any point P. The isophase lines except a few special ones are curves of 4th order, as may be understood from the above formula.

It will be seen from the drawing of FIG. 4 that on the line of symmetry, that is the line perpendicular in the midpoint of the line interconnecting the centers of the antenna systems I and II, the relative phase angle is zero, and that on the lines perpendicular in the midpoints of each antenna system I and II respectively—on which as well-known the frequency deviation of the associated antenna system is zero—the phase angle is −45 degrees or +45 degrees respectively with respect to said reference phase signal. In the space between the phase lines of zero degree and the phase lines of −45 degrees or +45 degrees respectively corresponding phase angles are existing as shown in FIG. 4. It can be seen that, disregarding the short range field, the isophases run almost in parallel, and that the phase angle is varying rather quickly within the lane of −45 to +45 degrees at an increasing deviation from the line of symmetry. In this embodiment, however, frequency deviation itself becomes smaller with increasing distance from the beacon as may be seen from FIG. 4 too, as the phase lines are approaching more and more to the line where frequency deviation of the associated antenna system is zero.

It is still to be noted that in this embodiment the phase fields in all four quadrants are equal, that is mirror-image like with respect to the line of symmetry ($y$-axis) and to the line interconnecting the centers of the antenna systems I and II ($x$-axis).

In order to prevent that the resulting frequency deviation becomes too small in the remote radiation field, according to a further embodiment of the invention, the linear antenna systems are located at a predetermined inclination angle with respect to the line interconnecting their centers, as may be seen from FIGS. 5 and 6 of the drawings. It is, however, obvious that in these embodiments a mirror-image-like symmetry of the isophase fields in all four quadrants is no longer established, but only an axial-symmetry as to the $y$-axis.

In order to illustrate the variability of the isophase fields, reference is made to FIG. 5 where two linear antenna systems I and II are arranged at an inclination angle of 45° with respect to the line interconnecting their centers, and the simulated antenna motion on the proper antenna system is carried out with a relative phase angle of 90°.

The individual lines of constant relative phase can also be computed by means of the formula mentioned hereinbefore or can be obtained by a graphical method. The form of the curves in the four quadrants is shown in FIG. 5. Particularly it will be seen a peculiarity that a zero degree relative phase will be detected on a line situated symmetrically to the antenna systems I and II as well as on the circle extending through the centers of each antenna system I and II, the diameter of the circle corresponding to the distance ($2e$) of the centers of the antenna systems I and II.

In FIG. 6 a further set of isophase lines is shown which originates when the linear antenna systems I and II are inclined at an angle of 15° towards the line interconnecting their centers and when the motion of a single antenna on each antenna system is simulated with a phase shift of +45 or −45 degrees with respect to the reference phase signal. The phase field may be constructed or calculated. The phase lines with zero degree phase are again, like in FIG. 5, the symmetry line and a circle extending through the centers of the antenna systems with its central point displaced correspondingly on the line of symmetry. It will be seen from FIG. 6 that using an inclination angle of 15° about 30 percent of the total frequency deviation available is effective, and that the isophase lines run almost in parallel in the proximity of the line of symmetry ($\varphi=0$), which fact may be of advantage for enroute aircraft guidance.

Assuming the simulated movements of the two single antennas being carried out with any other phase angle rather than 90°, e.g. with 60°, the shape of the phase lines will not change. But the resulting frequency deviation, and consequently the signal amplitude derived therefrom will become larger in those zones where the frequency deviations resulting from the individual antenna systems are composed with an identical sign to form a resulting frequency deviation; they become smaller in those areas where one of the deviation components has an opposite sign.

Within the area between the perpendicular lines erected in the midpoints of the antenna systems the frequency deviation becomes larger compared with an arrangement where simulated movements with a phase shift of 90° are used. It can be estimated that in a 60° system with an inclination angle of 15° the resulting frequency deviation on the line of symmetry will reach about 50 percent of the largest deviation of one of the antenna systems which can be obtained at all. Outside this lane, however, the resultant frequency deviation will become smaller again. But this fact is only of poor significance with respect to the reduction to practice of this system, because navigational information has to be available within the rather wide lane extending between the perpendicular lines in the midpoints of the antenna systems.

When a 60° system is used a relative phase of +30 or −30 degrees respectively is detected on each of the perpendicular lines in the midpoints of the antenna systems, as being produced by the corresponding antenna system on the opposite side of the line of symmetry, whereas in a 90° system the simulated antenna movements being phase shifted by 90°, phase angles of +45 or −45 degrees respectively are being measured on the perpendicular lines in the midpoints of the antenna systems, as already mentioned above.

In practice the value of the inclination angle of the antenna systems I and II, as well as the ratio of relative phase shift of the commutation frequency providing the simulated movements of the single antennas on their antenna systems will be chosen according to the purpose of practical application of the radio beacon, to the frequency deviation and phase gradient desirable.

Another embodiment of the invention is shown in FIG. 7 in which the two antenna systems are located in parallel to one another on oppoiste sides of the line of symmetry equi-distant by an amount $e$ therefrom. The simulated motion is carried out with a relative phase of 180 degrees. By simulating a motion of a single antenna on each antenna system a symmetrical field of lines of constant phase relationship is created, the isophase lines having circular shape, as shown in FIG. 7. The ratio of the frequency deviations $b$ and $a$ indicated by arrows in the proper frequency deviation patterns of FIG. 7 is constant for any phase line with constant relative phase $\varphi$, so that $$\frac{b}{a} = \frac{1+tg\varphi}{1-tg\varphi} = \text{constant}$$

a special line with relative phase $\varphi=0$ is the line of symmetry being the perpendicular line erected in the midpoint of the line interconnecting the centers of the antenna systems. The location of the center points $X_M$ of the circles on the x-axis being the line interconnecting the centers of the antenna systems can be calculated from the formula $$X_M = \frac{e}{\sin 2\varphi}$$

and the radius of the circles from the formula $$r = e|\cotg 2\varphi|$$

A beacon system of this type may be used for guiding a craft in a circular path in a holding area.

The advantages of the embodiments of this invention providing beacon systems for enroute and terminal area guidance of aircrafts are that course lines of various shape can be provided, especially running in parallel or in circles, whereas in conventional systems providing course lines by constant instrument reading they run to the origin of the radiation from all directions in a star-shaped manner. The lines of constant relative phase running in parallel with respect to a predetermined course ($\varphi=0$) are being received with almost constant field strength independent of the distance of the receiver from the beacon, so that satisfactory positional information can be obtained in the remote radiation field, a fact which is of importance when positional signals are to be imposed to an automatic piloting device.

In the beacon system according to the invention the antenna systems are sufficiently spaced on opposite sides of the runway so as to be no obstruction for landing aircraft. After touch-down the landing aircraft runs between the antenna systems whereby directional information is also available in the rear of the antenna arrangement. Moreover the frequency modulated positional information transmitted by the beacon is not subjected to interferencial effect in the airborne receiver as being known from conventional types of landing beacons operating with amplitude modulated signals.

In conventional types of landing beacons the received signals in an aircraft approaching the beacon, this is in the area where field strength of the radiated signals becomes higher, serious interferences will occur due to reflections of transmitted energy from buildings or other aircraft flying in the vicinity of the beacon. On account of this fact the reception of beacon signals is often disturbed during flareout and touch-down where lateral guidance of aircraft is most important, that the received signals are not suitable for being used as directional information. Such deficiencies are avoided in the Doppler-type beacon embodiments according to the invention, because directional information is obtained from a frequency modulation of the signals.

The evaluation of transmitted signal of the beacon embodiments according to FIG. 4 through FIG. 7 of the invention can be performed in a conventional manner by means of a special type of receiving equipment suitable to detect the phase angle between two low-frequency signals derived from the modulations of the beacon energy, of which one is an amplitude modulation the other a frequency modulation. It will be noted that conventional VOR airborne receivers are suitable for this purpose without requiring any circuit alterations when the antenna systems have suitable dimensions and the commutation frequency is suitably chosen.

While the invention has been described above in conjunction with specific embodiments, it is to be understood that this description is made only by way of example and not as a limitation to the scope of the invention as set forth in the objects thereof and in the accompanying claims.

What is claimed is:

1. A radio navigation system to derive positional information on board a vehicle comprising at a ground installation first and second antenna means positioned on either side of a line of symmetry and spaced therefrom by several wavelengths of the operating radio frequency, two sources of radio frequency signals of different frequencies, each of the antenna means radiating a directive modulation pattern, said patterns being identical and located mirror image like with respect to said line of symmetry, said antenna means being energized by said sources of radio frequency signals respectively, so that a composite modulation pattern is created in space and the equivalent is set up in a receiver carried by said vehicle composed of said directive modulation patterns, said composite pattern representing loci of equal electrical quantities providing positional information with respect to said line of symmetry; airborne receiving means to derive from said composite pattern in space and said equivalent set up in said receiver, said positional information representative of the value of said loci indicative of the spatial deviation of said vehicle from said line of symmetry.

2. A radio navigation system to derive positional information on board a vehicle comprising at the ground installation first and second directive antenna means positioned on either side of a line of symmetry and spaced therefrom by several wavelengths of the operating radio frequency, two sources of radio frequency signals, a first source being unmodulated and the second source being modulated, the radio frequencies and the modulation frequencies respectively being equal but in predetermined relative phase relationship other than 0° or 180°, e.g. in phase quadrature, said antenna means being successively energized by said sources of radio frequencies respectively by means of a switching device, each of said antenna means radiating a directive pattern; airborne receiving means adapted to derive information from said radio frequency amplitude and said modulation frequency amplitude received from said first antenna means and to add this value vectorially to the information from said radio and modulation frequency amplitude received from said second antenna means, the vector sum being formed according to the relative phase relationship between said radio frequencies or said modulation frequencies respectively, and means to detect the phase angle between said first information value and said vector sum, said phase angle being indicative of the spatial deviation of said vehicle with respect to said line of symmetry.

3. A radio navigation system to derive positional information on board a vehicle comprising at the ground installation first and second directive antenna means positioned on either side of a line of symmetry and spaced therefrom by several wavelengths of the operating frequency, a first and a second source of radio frequency signals different in frequency by a predetermined amount $\Delta F$, said radio frequency signals being modulated with a predetermined modulation frequency said modulation frequency of said first and second radio frequency signal having a predetermined relative phase relationship other than 0° or 180°, e.g. being in phase quadrature, said first and second antenna means being simultaneously energized by said sources of modulated radio frequency signals, each of said antenna means radiating a directive modulation pattern, said patterns being vectorially composed to form a composite pattern of isophases in space, each line of said composite pattern in space representing a locus of constant relative phase relationship with respect to a reference phase signal transmitted by the ground installation; airborne receiving means suitable to detect said radio frequency signals within a common receiving channel and to derive therefrom a beat frequency of frequency $\Delta F$, said beat frequency being amplitude modulated at a modulation degree according to the vector sum of said modulations of said radio frequencies, demodulation means to provide from said modulated beat frequency a signal of the modulation frequency the relative phase of which as compared with said reference phase signal is indicative of the spatial deviation of said vehicle from said line of symmetry.

4. A radio navigation system to derive positional information on board a vehicle comprising at the ground installation first and second linear antenna systems positioned on either side of a line of symmetry and spaced therefrom by a plurality of wavelengths of the operating radio frequency, said linear antenna systems comprising a plurality of omnidirectionally radiating elements, a first source of radio frequency signals of frequency $F_1$, a second source of radio frequency signals of frequency $F_2$, said frequencies $F_1$ and $F_2$ being different by a predetermined frequency amount $\Delta F$, said radiating elements of said first and second linear antenna systems being successively energized by said first and second source of radio frequency signals respectively by means of a switching device so that a reciprocating (180°-phase) movement of a single radiating element on each linear antenna system is simulated, each antenna system thus setting a directive frequency deviation pattern, said patterns being vectorially composed in space according to said frequency deviation magnitude and relative phase relationship of said simulated movements of said single radiating elements on their appropriate antenna systems to form a composite pattern of differential frequency modulation, each line of said composite pattern representing a locus of constant frequency deviation; airborne receiving means suitable to detect said radio frequencies $F_1$ and $F_2$ within a common receiving channel and to derive therefrom a beat frequency of frequency $\Delta F$ which is frequency modulated due to Doppler effect at the rate of said simulated motion frequency of said single radiating elements according to the vector sum, and means to provide from said frequency modulated beat frequency by frequency demodulation a signal, the magnitude of which is representative of one of said loci of constant frequency deviation indicative of the spatial deviation of said vehicle from said line of symmetry.

5. A radio navigation system to derive positional information on board a vehicle comprising at the ground installation first and second linear antenna systems comprising a plurality of omnidirectionally radiating elements, positioned on either side of a line of symmetry and spaced therefrom by a plurality of wavelengths of the operating radio frequency, a first source of radio frequency signals of frequency $F_1$, a second source of radio frequency signals of frequency $F_2$, said frequencies $F_1$ and $F_2$ being different by a predetermined frequency amount $\Delta F$, said radiating elements of said first and second linear antenna systems being successively energized by said first and second source of radio frequency signals respectively by means of a switching device, so that a movement of a single radiating element on each linear antenna system is simulated, these movements running with a predetermined time (phase) relationship other than a 0° or 180° time (phase) relationship, each antenna system thus setting a directive frequency deviation pattern, said patterns being vectorially composed in space according to said frequency deviation magnitude and relative phase relationship of said simulated movements of said single radiating elements on their appropriate antenna systems to form a composite pattern of isophases in space, each line of said composite pattern in space representing a locus of constant relative phase relationship with respect to a reference phase signal transmitted by the ground installation; airborne receiving means suitable to detect said radio frequency signals of frequency $F_1$ and $F_2$ within a common receiving channel and to derive therefrom a beat frequency of frequency $\Delta F$ which is frequency modulated due to Doppler effect at the rate of said simulated motion frequency of said single radiating elements according to the vector sum, and means to provide from said frequency modulated beat frequency by frequency demodulation a low frequency signal, the phase of which is representative of one of said loci of constant relative phase relationship with respect to said reference phase signal, the value of said relative phase being indicative of the spatial deviation of said vehicle from said line of symmetry.

6. A radio navigation system according to claim 1 wherein said antenna means are successively energized by said sources of radio frequency signals.

7. A radio navigation system according to claim 1 wherein said antenna means are simultaneously energized by said sources of radio frequency signals.

References Cited in the file of this patent

UNITED STATES PATENTS

| | | |
|---|---|---|
| 2,543,081 | Watts et al. | Feb. 27, 1951 |
| 2,593,485 | Pickles et al. | Apr. 22, 1952 |